INVENTORS
ROGER E. WALTERS
CHARLES K. KUMMER
GARY W. WHITE
BY Robert V. Burkhardt

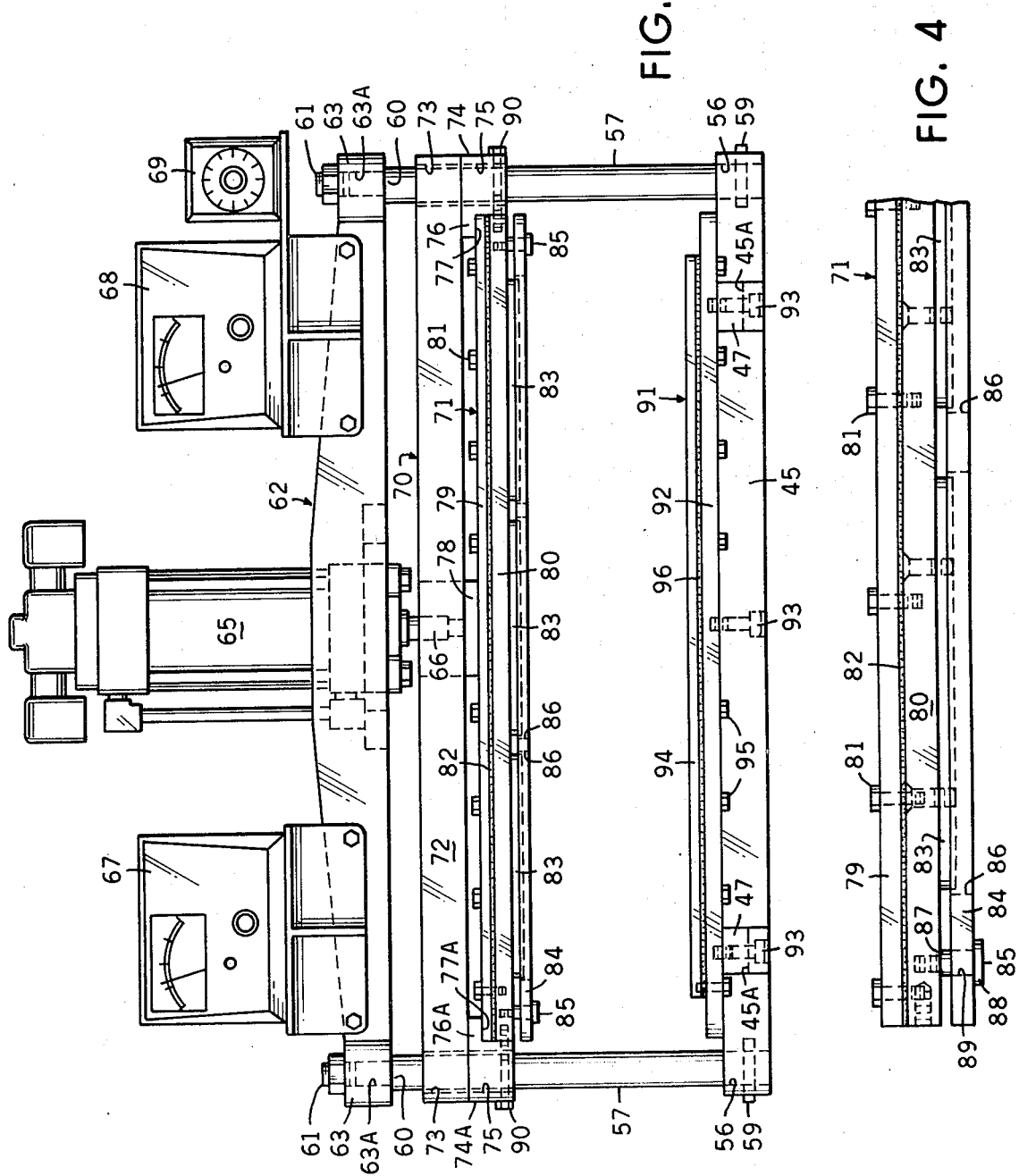

United States Patent Office 3,689,276
Patented Sept. 5, 1972

3,689,276
DERMA FIBER MACHINE
Charles Karl Kummer, St. Louis, Roger E. Walters, Glendale, and Gary Wayne White, Afton, Mo., assignors to Ralston Purina Company, St. Louis, Mo.
Filed Apr. 29, 1971, Ser. No. 138,457
Int. Cl. B01j 1/02
U.S. Cl. 99—234 R   12 Claims

ABSTRACT OF THE DISCLOSURE

A machine for the manufacture of an artificial or fabricated skin is disclosed having a movable material supply mechanism for predeterminately metering a desired quantity of material onto a conveyor. The conveyor thereafter moves the material to a position between a pair of heated platens, at least one of which is reciprocally movable. When the platens are in mating engagement, they define a plurality of cavities having the desired shape and configuration of the skin to be fabricated. A fluid pressure responsive motor on the apparatus is effective to urge the platens together with a predetermined pressure to effect the distribution of the material to completely fill the cavities and simultaneously with the exertion of pressure heat is supplied to the formed material to coagulate at least the surface proteins thereof. After the formation of the skin, the platens are separated and the conveyor is used to discharge the skin from the machine.

BACKGROUND OF THE INVENTION

It is well-known in the food processing art and particularly in the preparation of poultry products such as poultry rolls, poultry roasts, etc. to utilize poultry skin as a portion of the final product. Particularly, the poultry skin is utilized in encasing or covering the processed poultry food products. In preparing products of this nature, it was necessary that the poultry be deboned so as to obtain whole poultry skin pieces in as large a piece as possible. These poultry skin pieces were then presized or cut to obtain poultry skin in the desired size, shape and configuration. Since it was extremely difficult to obtain poultry skin in an unblemished condition of the desired size and shape, extreme difficulty was encountered at times in obtaining the desired number of such poultry skins. Further, the available skin on a poultry carcass yields approximately only two or three skins of the size desired for production of products of this class. Thus, it was desirable to find an alternative method of obtaining poultry skin for use on poultry products.

A method was discovered for making artificial or fabricated poultry skins by utilizing a mixture of comminuted poultry meat and poultry skin and subjecting a predetermined portion thereof to heat and pressure. The heat and pressure applied to the poultry meat and skin mixture served to form it into the desired shape and thickness and to effect a partial coagulation of the protein thereof to produce a fabricated skin which substantially resembles natural poultry skin.

Therefore, it is the object of the present invention to provide a machine for continuously manufacturing artificial or fabricated poultry skins of desired shape from a mixture of ground poultry meat and skin.

Another object of the present invention is to provide a machine of simplified configuration for manufacturing a plurality of fabricated skins having the desired shape.

These and other objects and advantages of the present invention will become apparent from the description hereinafter.

SUMMARY OF THE INVENTION

Briefly, the present invention comprises a machine having a base, a pair of heated platens connected to the base and adapted for mating engagement to define a plurality of cavities therebetween having a shape and size of the desired configuration of a fabricated skin, a feed mechanism for metering a predetermined amount of the material to be utilized in fabricating the skin and a conveying member for moving the material from the feed mechanism to the area between the heated platens whereby the heated platens may be brought together to compress the material, distributing it uniformly throughout the cavity and simultaneously, applying heat through the platens to partially coagulate the protein of the poultry meat and skin mixture and thereafter the heated platens are separated and the conveying means is effective for removing the fabricated skin from the area between the heated platens.

DESCRIPTION OF THE DRAWINGS

FIG. 3 is a view of the machine of FIG. 2 taken along the line 3—3, and FIG. 4 is an elevation of the upper heated platen of the machine of FIG. 1.

PREFERRED EMBODIMENTS OF THE PRESENT INVENTION

Figure 1:
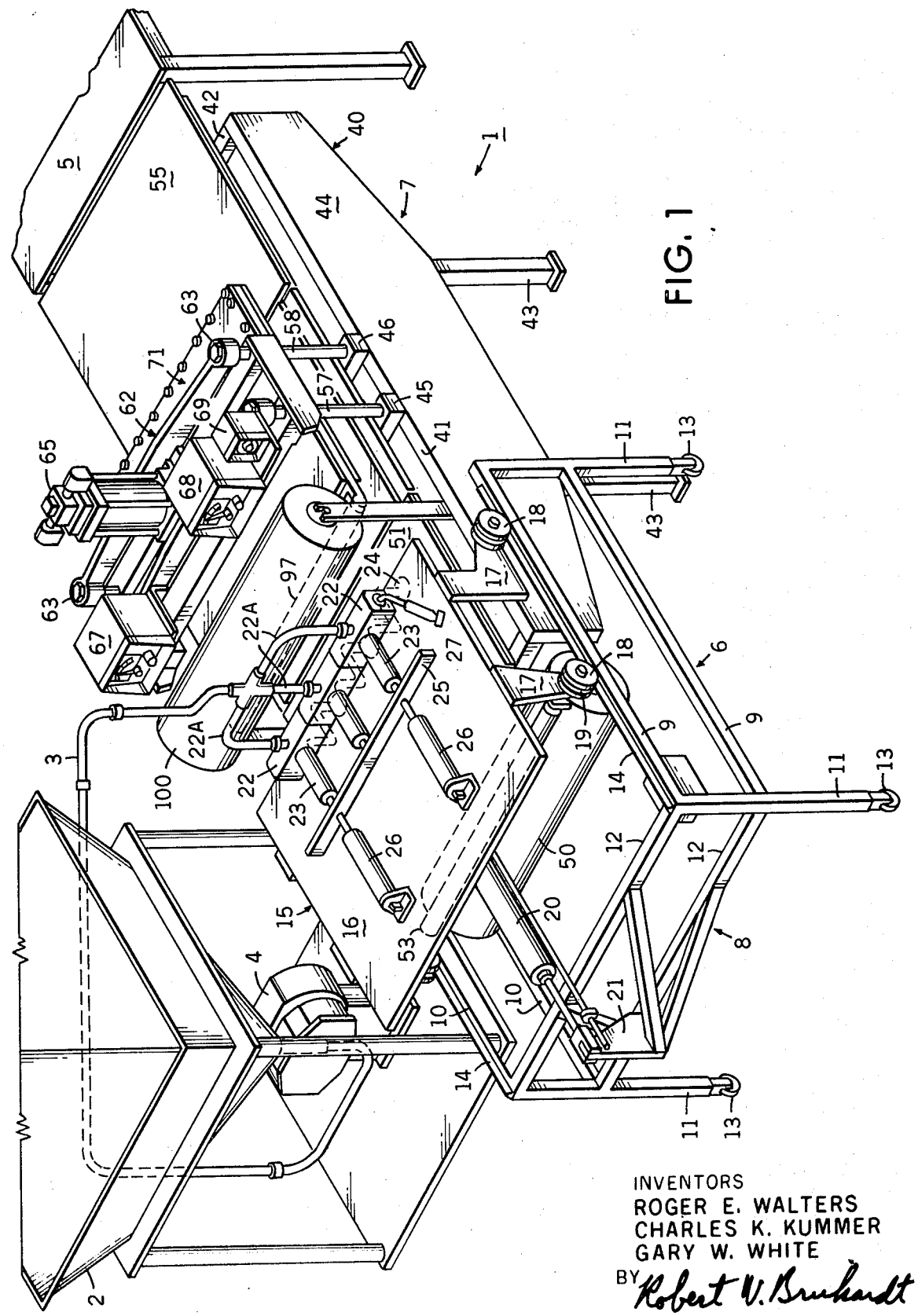
FIG. 1 is an isometric view of the apparatus embodying the present invention for use in making a fabricated skin.

The apparatus of the present invention is to be utilized in continuously forming an artificial poultry skin from a mixture of poultry skin and meat. The mixture of raw poultry skin, poultry meat and/or other edible poultry by-products are formed into a matrix or emulsion having coarse particles therein. This emulsion or matrix may be formed by comminuting or reducing the size of the particles of a mixture of poultry skin and/or meat and/or edible by-products. The desirable magnitude of the particles of the matrix or emulsion should be such that a substantial portion of the particles do not have a size dimension larger than ¼" and preferably have at least one size dimension larger than .020" with the particle sizes falling primarily within these 2 size limitations. If all the particles were to have a size dimension larger than ¼", the product produced would not have the desired looks of natural poultry skin and if all the particles were to have dimensions less than a .020" it would not produce the desired fiber structure to resemble natural poultry skin. From the foregoing, it is apparent, that to achieve the desired appearance of natural poultry skin it is necessary that a substantial portion of the particles in the matrix have sizes which do not have a dimension in excess of ¼" and which are not smaller than .020". The poultry materials are so converted to the desired particle formation by use of a standard cutter, preferably of the rotating bowl type having rotating cutter blades disposed normally to the base of the bowl, such as a Schnellkutter, or Hobart Vertical Cutter Mixer, but not limited to these types of cutters alone. The raw poultry material is placed in the cutter and as comminution commences, ice is gradually introduced to the cutter to lower the temperature of the ingredients therein. During the preparation of the matrix, the temperature thereof should be maintained below approximately 50° F. This is accomplished either by the addition of ice to the matrix or by pre-chilling the ingredients before they are subjected to the comminuting operation. It should be noted that it is desirable to use ice in the comminution operation since not only does the ice serve to cool the matrix but also acts as a lubricant which enables a more complete mixing of the ingredients contained in the cutter. Based upon the quantity of product in the cutter, the duration of time required to effectuate this phase will vary. However, the chopping or comminuting should be sufficient to obtain an emulsion having the size particles previously referred to. The finalized emulsion should be very tacky and paste-like in substance and have a temperature below approximately 50° F.

It is possible to form the emulsion or matrix totally from comminuted poultry skin, however, it has been found that a more desirable derma-fiber skin may be produced when poultry meat and/or edible poultry by-products such as neck meat and residual carcass meat, are contained in the emulsion. The presence of meat in the emulsion serves to reduce the shrinkage of the derma-fiber skin when it is coagulated as will be described hereinafter. The desired skin characteristics are best obtained when the poultry skin is 50% or less of the weight of the emulsion and preferably should constitute approximately 35% of the matrix. Either white or dark poultry meat will perform equally well or a combination of these meats may be used in preparing the matrix. It may be desirable to control the white and dark meat added to the matrix since the amount of dark meat used will effect the coloring of the skin when it is cooked. Preferably for the derma-fiber skin to attain the desired color, the dark meat should not exceed 50% of the meat added. The foregoing is merely illustrative of the method of preparing a matrix which may be formed into a fabricated skin. If desired, other methods of preparing the matrix may be utilized.

A predetermined portion of this matrix mixture is then subjected to heat and pressure to partially coagulate the protein thereof and form an artificial skin substantially resembling natural poultry skin. Desirably, the skins will have a thickness substantially the same as naturally occurring poultry skin, usually ¼ inch or less and preferably approximately ⅛ inch in thickness. The apparatus of the present invention is to be utilized in continuously performing this portion of the method of fabricating the artificial skin.

Referring now to FIG. 1, a machine for producing fabricated or artificial skin, indicated generally at 1, is connected to a vat or material supply bin 2 by means of a conduit 3. The vat 2 is adapted for receiving a quantity of the mixture of ground or comminuted poultry meat and skin which will be subsequently fabricated into the imitation poultry skin of the desired size and shape. The vat 2 is equipped with a pump 4 at the discharge portion thereof for pumping the matrix of poultry meat and poultry skin material through the conduit 3 to the machine 1. In addition, a work or discharge table 5 is shown which provides a work surface for the operator following the discharge of the fabricated skin from the machine 1. The discharge table 5 may also be used as a cooling area to allow the fabricated skin discharged from the machine to be cooled prior to subsequent handling. It may be desirable to use a table 5 having cooling coils therein to effect the cooling of the fabricated skins more rapidly so that the skins may be handled sooner.

The machine 1 consists of two separate units, a movable material supply portion 6 and a fabricated skin formation portion 7. It should be understood that if desired, the supply portion 6 and fabrication portion 7 could be formed on a single frame, however, for ease of cleaning, it is desirable that the supply portion 6 be separable from the fabrication portion 7. The material supply portion 6 consists of a frame unit indicated generally at 8 having horizontally extending members 9 and 10 which are connected to the legs 11. Cross brace members 12 are provided at the leftward end of the frame unit 8 (as viewed in FIG. 1) to form an integral rigid supporting structure. The legs 11 are provided with rollers or casters 13 which permit the frame 8 to be moved toward and away from the fabricated skin formation portion 7 to facilitate cleaning of the machine unit 1. The upper portion or face of the horizontal members 9 and 10 are provided with angle iron track members 14 which extend substantially the entire length of the vertical members 9 and 10.

A feed supply carriage member, indicated generally at 15, is provided with a mounting plate 16 which has legs 17 connected on the opposed sides thereof by suitable means such as welds. The legs 17 are provided with rollers or wheels 18 which are connected thereto in any convenient manner which is known in the art. It should be noted that the carriage rollers 18 are provided with grooves 19 which are adapted for secure rolling contact with the angle iron track members 14. A fluid pressure responsive motor or air cylinder 20 is connected to the plate member 16 by suitable means, and is also connected to an anchor frame member 21 which is provided on the cross braces 12. Since the air cylinder 20 is connected to the anchor brace member 21 and to the feed supply carriage member 15, the activation of the air cylinder 20 is effective to move the entire carriage member 15 along the angle iron tracks 14. Thus, as is readily apparent, the carriage member 15 can be moved in a forward and reverse direction on the frame unit 8 of the material supply portion 6 by controlling the activation of the air cylinder 20.

The plate member 16 also has connected thereto a plurality of metering or dispensing valves 22. These valves are of the positive piston displacement type, such as a Bock Filler-Depositor which are commercially available from suppliers such as St. Regis Corporation. It should be understood that other types of valves may be utilized which are adapted for metering a predetermined quantity of the matrix or emulsion of poultry skin and meat. It should be understood that any number of these valves may be provided depending on the operator's preference, and for the purpose of illustration, the apparatus as shown is provided with 3 of these valves. The inlet of the metering or dispensing valves 22 are connected to the conduit 3 by means of the conduits 22A. The operation of a valve of the type shown is well-known and will only briefly be described herein. Each of the valves 22 is provided with a piston 23 which is effective for discharging a predetermined amount of the material supplied through the conduit 22A from the nozzle 24 connected to the metering valve 22. The pistons 23 are connected to a driving bar 25 and driven by means of a pair of air actuated cylinders 26 which are connected to the plate 16 and to the driving bar 25. By controlling the movement of the driving bar 25 it is possible to control the movement of the piston 23 and thereby the amount of the matrix material discharged from the nozzle 24. The air cylinder and linkage arrangement 27 is effective for controlling the movement of the cam within the valve 22 to meter the material from the conduit 22A to the piston 23. Thereafter the cam is rotated by the air cylinder and linkage arrangement 27 to connect the piston 23 with the nozzle 24 and the driving bar 25 moves the piston 23 to meter the material through the metering valve 22 and out the nozzle 24.

Figure 2:
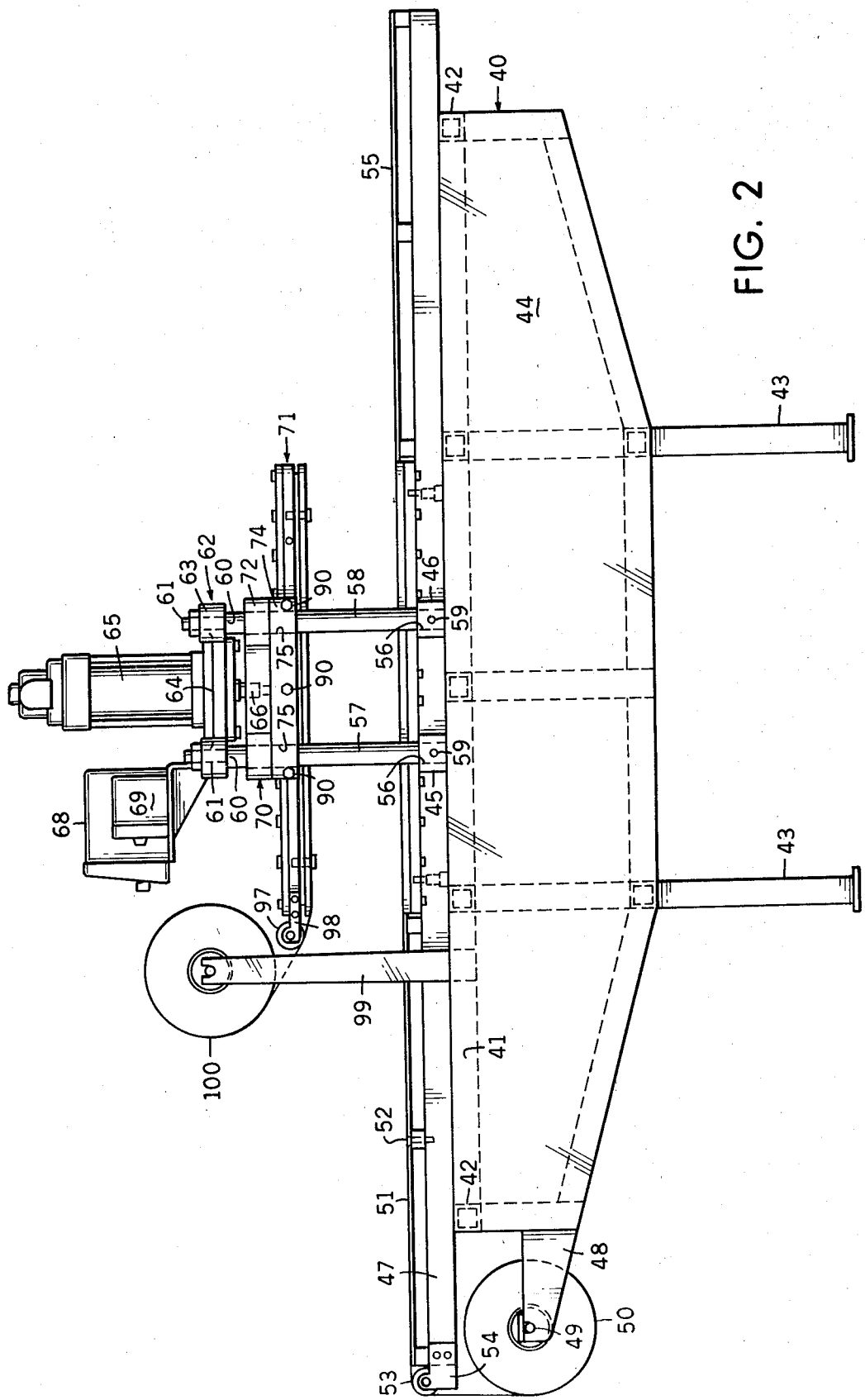
FIG. 2 is a side view of the machine of FIG. 1.

Referring now to FIGS. 1 and 2, the fabricated skin formation portion 7 is provided with a frame indicated generally at 40 which consists of a pair of vertical support members 41 which are connected at the ends thereof by cross braces 42. The braces 41 are also provided with legs 43 which are adapted for stationary mounting to the floor. If desired, stainless steel panels 44 may be provided on the members 41 and the legs 43. In addition, a pair of cross braces 45 and 46 are provided between the vertical members 41 substantially intermediate of the cross braces 42 and are attached to the upper portion on top of vertical members 41. As best seen in FIG. 3, the intermediate cross member 45 is provided with a pair of notches 45A, therein for receiving the notched portion of the vertical brace members 47 which extend the entire length of the unit and beyond the ends the cross braces 42 and which are intermediate of the vertical members 41. It should be realized that although the cross member 46 is not shown in FIG. 3, it is provided with the same notch arrangement as is provided in cross member 45. Thus, the vertical members 41 and 47 and the cross braces 42, 45 and 46 serve to form a rigid, integral base for the fabricated skin formation portion 7 of the machine 1.

The leftward end of the frame 40 is provided with a pair of brackets 48 which are adapted to receive a shaft 49 on which may be mounted a roll of poly-ethylene or conveying material 50. In addition, the leftward end of the machine 7 is provided with a plate member 51 which is connected to the vertical members 47 by suitable means such as bolts 52. As is clearly shown in FIG. 1, the plate 51 is of a size such that the feed mechanism carriage 15 may deposit a predetermined number of portions of the matrix of poultry skin and meat mixture to be utilized in preparing the fabricated poultry skin thereon. Also, it should be noted that an idler roller 53 is provided on mounting brackets 54 which are attached to the leftward end of the vertical beams 47 to prevent the tearing of the poly-ethylene material as it is removed from the roll 50 and moved through the machine 1.

The rightward end of the machine portion 7 is provided with a discharge plate 55 for receiving the finished fabricated skins from the machine. The plate 55 is connected to the vertical members 47 in the same manner as is plate 51. Also, the plate 55 is provided in the same vertical plane as the plate 51 to facilitate movement of the material through the machine portion 7.

The cross members 45 and 46 are provided with apertures 56 at the opposed ends thereof which are adapted for receiving the guide posts or rams 57 and 58, respectively. The guide posts 57 and 58 are secured into the members 45 and 46 by means of pins 59. It should be noted that the guide posts 57 and 58 are each provided with an abutment shoulder 60 and an upper threaded portion 61 thereon. A mounting bracket member, indicated generally at 62, is provided with bushing portions 63 at the corners thereof which have apertures 63A therein for receiving the threaded portion 61 of the guide posts 57 and 58. In addition, the mounting bracket 62 is provided with a recessed portion 64 in the area intermediate of the bushing portions 63. When the mounting bracket 62 is positioned on the guide posts 57 and 58, the lower portion thereof rests on the abutment shoulder 60 which serves to maintain the mounting bracket in its vertical position. A positive actuation air cylinder 65, which is well-known in the art and commercially available, is mounted on the recessed area 64 by suitable means such as bolts. The push rod 66 of the air cylinder 65 extends below the mounting bracket 62 and is substantially centrally located with respect to the mounting bracket. In addition, it should be noted that temperature controls 67 and 68 are provided on the mounting bracket 62 by suitable means such as bolts and that a timer 69 may also be provided thereon. The temperature controls 67, 68 and the timer 69 are commercially available units and may be obtained from suppliers such as Fenwald Company and E. W. Bliss Company.

Attached to the push rod 66 is an upper carriage unit 70 for carrying the heated platen assembly indicated generally at 71. The carriage member 70 consists of a pair of bar members 72 which are provided with apertures 73 at the opposed ends thereof which are adapted for slidable movement on the guide posts 57 and 58, respectively. The bar members 72 also have connected at the opposed ends thereof spacer or retainer plates 74, 74A. The spacer plates 74 and 74A are provided with apertures 75 for slidable movement on the guide posts 57 and 58. The spacer or retainer plates 74, 74A are connected to the bar members 72 by suitable means such as welds. The spacer plates 74, 74A are provided with inwardly extending portions 76, 76A to define abutment shoulders 77, 77A. In addition, it should be noted that a center hub portion 78 is connected to the push rod 66 and connects the bar members 72 at the intermediate portion thereof. Thus, the center hub 78 serves to connect the carriage 70 to the push rod 66 by suitable means such as threaded engagement. The lower face of the hub portion 78 is in the same horizontal plane as the abutment shoulders 77, 77A.

Referring now to FIGS. 3 and 4, the heated platen assembly 71 consists of an upper or top plate member 79 provided in abutting engagement with the shoulders 77, 77A on the spacer members 74, 74A and with the hub portion 78 on the plate 72. As more clearly seen in FIG. 4, the upper or top plate member 79 has connected thereto a die plate member 80 by suitable means such as a plurality of bolts 81 about the periphery thereof. A silicone rubber heater 82 in provided between the top plate 79 and the die plate 80. This heater is of a standard commercially available type which may be obtained from suppliers such as Watlow Company. It should be understood that it is not necessary that a silicone rubber heater be utilized, but other means may be utilized for effecting the heating of the die plate 80 to obtain a uniform heating thereof. Connected to the die plate 80 by suitable means such as bolts, are die members 83 which have a size and shape of the skin which is to be fabricated. Depending on the operator's preference, the number of die members to be utilized can be varied. As shown in FIG. 3, the die plate 80 is provided with three dies 83 thereacross; however, this could be varied by any number depending on the size and shape of the die and the operator's preference. Also attached to the die plate 80 is a floating bushing plate 84. The floating bushing plate 84 is connected to the die plate 80 by a plurality of threaded studs 85 about the periphery thereof. The floating bushing plate 84 is also provided with apertures 86 which are provided with close tolerances with the die members 83. It should be noted that the studs 85 are provided with an abutment portion or shoulder 87 and an abutment head 88. The bushing plate 84 is also provided with apertures 89 which receive the studs 85 and permit the sliding movement or floating motion of the bushing plate 84 thereon. The abutment shoulder 87 on the studs 85 insures that a uniform spacing is maintained between the bushing plate 84 and the die plate 80. In addition, it should be noted that the abutment heads 88 on the studs 85 serve to retain the bushing plate 84 in connection with the die plate 80 and yet the bushing plate may move or float between a position engaging the abutment heads to a position engaging the die plate member 80. Further, it should be noted that the upper plate 79 of the heated platen assembly 71 is maintained in engagement with the hub portion 78, and shoulders 77, 77A on the plates 74, 74A, by bolts 90 provided through the spacer or retainer plates 74, 74A and into the die plate 80.

The lower die member or heated platen, indicated generally at 91, is provided with a lower plate 92 which is connected to the cross beams 45 and 46 and the vertical members 47 by suitable means such as bolts 93. A die plate or platen 94 is connected to the bottom plate 92 by a plurality of bolts 95 about the periphery thereof and a second silicone heater 96 is provided intermediate of the plate 92 and platen 94. For ease of moving the material through the machine 1, the platen 94 is maintained in the same vertical plane as are the plates 51 and 55; however, it should be understod that if desired the lower platen 94 could be movable. It should be noted that the lower platen 94 is sized predeterminately smaller than the upper platen and bushing plate assembly 71 so that when the platens are moved together the lower platen 94 does not interfere with or engage the studs 85. Thus, when the platens are brought together, the bushing plate 84 engages the platen 94 and the stud arrangement allows the free movement of the die plate 80 toward the bushing plate 84 until engagement therebetween is established. It should also be noted that an idler roller 97 is provided on the end of the die plate 80 by suitable means such as the brackets 98. To complete the description of the machine 1, it should be noted that brackets 99 are provided on the vertical members 41, by suitable means, for receiving a roll of poly-ethylene film 100.

In the operation of the machine 1, the matrix as prepared in accordance with the foregoing is supplied to the vat 2. The temperature gauges 67 and 68 are adjusted to control the temperature of the heating elements 82 and 96, respectively, which serves to effect the heating of the upper die element and platen assembly 71 and the lower platen 94. Desirably, this temperature will be adjusted to within the range of 110° F. to 210° F.; however, other temperatures may be used depending on the operator's preference. At the same time, the timer 69 is adjusted so as to control the dwell time during which the air cylinder 65 maintains the heated platen members 71 and 94 in mating engagement. This dwell time for the temperatures indicated above would be approximately 3–90 seconds for fabricating poultry skins as previously described. It has been found preferable that the heating elements and dwell time be adjusted such that the matrix material be subjected to the temperatures of approximately 103° F. to 140° F. for a period of approximately 20 seconds to form a skin having a thickness of about ⅛ inch.

After the machine has had an opportunity for the heated platents to be uniformly heated throughout, the pump 4 is activated serving to force the matrix through the conduit 3 to the valves 22 on the feed carriage 15. The conveyor or poly-ethylene film is unwound from the roll 50 and fed through the machine 1 over the plate 51, the platen 94, and the plate 55 to the discharge table 5. The other poly-ethylene film on the roll 100 is also unwound and fed between the platens 71 and 94, and over the plate 55 to the discharge table 5. It should be understood that the poly-ethylene material serves the dual function of conveying the poultry material and fabricated skin through the machine 1 and of preventing the poultry skin from adhering to the heated platens during the cooking operation. If desired, the platens may be coated with a material to prevent the sticking of the fabricated skins thereto and other materials than poly-ethylene may be used as the conveyor. The feed carriage 15 in response to an applied force activates the air cylinder 25 and the piston displacement valves 22, so as to deposit a predetermined portion of the matrix material on the poly-ethylene film conveyor from the roll 50 which rests on the plate 51. If the upper platen assembly 71 is provided with aligned opening for forming multiple rows of skins, the air cylinder 20 is then effective to move the carriage 15 in a leftward direction to a preselected location spaced from the first deposit of matrix material and the piston valves 22, are again activated to deposit a predetermined quantity of the matrix material in a prearranged pattern to correspond with the pattern of the skin dies 83 on the platen assembly 71. These deposits of the matrix material will be made on the conveyor or poly-ethylene film resting on the plate 51. It should be realized that other placements or numbers of deposits could be utilized depending on the number of fabricated skins to be made in a single operation. Thereafter, the poly-ethylene conveyor having the matrix deposits thereon and the poly-ethylene from the upper roll 100 are pulled to a position in the area between the heated platen 71 and 94. As previously mentioned, the poly-ethylene material not only serves as a conveyor for the matrix material, but also serves to prevent the matrix material or the fabricated skin from sticking to the heated platens. After the matrix material is positioned substantially beneath the dies 83 of the upper heated platen assembly 71, the air cylinder 65 is responsive to an applied force which serves to move the upper heated platen 71 along the guide posts 57, 58 toward an operative position in mating engagement with the lower heated platen assembly 91. As the upper heated platen 71 is moved into mating engagement with the lower heated platen 94, the bushing plate 84 is engaged on the surface of the lower platen 94 with the martix material being received within the openings 86 of the bushing plate 84. Due to the floating connection of the bushing plate 84 to the upper die plate 80, the forec of the push rod 66 is still effective for uring the die plate 80 and dies 83 toward the lower platen 94 as the bushing plate rests thereon. In this manner, the dies 83 are effective for applying pressure to the matrix contained within the openings 86 so as to uniformly distribute the matrix material within the cavities formed by the platen 94, the dies 83 and the openings 86. This opening or cavity conforms to the size, shape and thickness configuration of the fabricated skin desired to be formed. It should be realized that other arrangements could be utilized so as to form the fabricated skin cavities between the platen assemblies 71 and 91 when the platens are in mating engagement, however, for ease of handling it has been found desirable to maintain the platen 94 substantially flat and allow the platen assembly 71 to define therewith the cavities. The timer is then effective for maintaining the heated platens 71 and 94 in mating engagement for the preselected time. Upon the lapse of the preset time, the timer 69 is effective to supply a force to actuate the air cylinder 65 which serves to urge the upper heated platen assembly 11 in an upward direction while it rides on the guide posts 57, 58 to its deactivated or normal position. The poly-ethylene film containing the fabricated skin therebetween is then moved from the area between the heated platens to the plate 55 and the work surface area 5 for further processing. It should be realized that during the heating operation which is effective to partially coagulate the proteins of the meat and matrix material to form the fabricated skin the material feed supply carriage 15 is furnishing deposits of the matrix material for processing as previously described. In this manner, a continuous operation of the machine 1 is effected for fabricating poultry skin.

In view of the foregoing, it is readily apparent that a novel machine is provided for fabricating poultry skin and that obvious modifications or changes in the exact configuration contained herein by way of examples may be made without departing from the spirit of the invention which is defined by the claims which follow.

We claim:

1. Apparatus for fabricating an artificial poultry skin from a mixture of comminuted poultry meat and skin comprising a frame, a pair of platens on said frame for forming the poultry mixture into the size and shape of artificial skin desired, means for supplying the poultry mixture between said platens, driving means for moving said platens between a spaced position and a position in mating engagement to form the poultry mixture into the size and shape of artificial skin desired and other means connected to said platens for supplying heat thereto and controlling the time said platens are in mating engagement to partially coagulate the proteins of the poultry mixture to form the fabricated skin.

2. The apparatus according to claim 1 wherein said frame includes guide posts thereon, a carriage member connected to said guide posts, said driving means being mounted on said carriage means, one of said platens being slidably mounted on said guide posts and connected to said driving means, the other of said platens being fixedly mounted to said frame, said driving means being responsive to an applied force for urging said slidably mounted platen from the spaced position to the the position in mating engagement with the fixedly mounted platen and said driving means being responsive to the lapse of time controlled by said other means for urging said slidably mounted platen to the spaced position.

3. The apparatus according to claim 2 wherein said means for supplying the poultry mixture between said platens includes a roll of poly-ethylene film mounted on said frame, the film of poly-ethylene being stripped from the roll and passed between the platens, and a valve member for metering a predetermined quantity of the poultry mixture onto the poly-ethylene film prior to being passed between the platens.

4. The apparatus according to claim 3 including a reciprocally moving carriage on said frame, control means connected to said frame and said carriage for effecting the movement of said carriage, said valve member being connected to said carriage for metering the predetermined qauntity of poultry mixture onto the poly-ethylene film at predetermined positions.

5. Apparatus for continuously manufacturing a fabricated poultry skin from a comminuted poultry meat and skin mixture comprising a frame, a conveyor movable on said frame, feed supply means on said frame and positioned above a portion of said conveyor for metering a number of individual units of a predetermined quantity of the comminuted poultry meat and skin mixture onto said conveyor, a pair of heated platens on said frame, said conveyor being movable to position the units of poultry meat and skin between said platens, driving means connected to at least one of said platens for effecting the movement thereof, said driving means being responsive to an applied force to move said platens between a spaced position and a position in mating engagement, said platens defining a number of cavities of predetermined size when in mating engagement, and means for maintaining said heated platens in mating engagement for a preselected period of time to form the units of poultry meat and skin into a fabricated poultry skin of desired size.

6. The apparatus according to claim 5 wherein one of said heated platens is fixedly mounted on said frame and the other of said heated platens is reciprocally movable on said frame in response to said driving means between the spaced position and the position in mating engagement with said fixedly mounted heated platen.

7. The apparatus according to claim 6 wherein said movable heated platen comprises a die member connected to said driving means and a floatable bushing plate connected to said die member, said bushing plate having a plurality of openings therein aligned with said die member, said cavities being defined by the openings in said bushing plate between said die member and said fixedly mounted platen when said platens are in mating engagement.

8. The apparatus according to claim 7 wherein said conveyor comprises a roll of poly-ethylene material mounted on said frame, said poly-ethylene material being stripped from said roll and passed beneath said feed supply means, between said platens and discharged therefrom.

9. The apparatus according to claim 6 including a carriage member on said frame above said movable platen, said driving means being mounted on said carriage member and connected to said movable platen.

10. Apparatus for continuously manufacturing a fabricated poultry skin from a comminuted poultry meat and skin mixture comprising a frame including guide posts, a conveyor movable on said frame, feed supply means on said frame and positioned above a portion of said conveyor for metering a predetermined quantity of the comminuted poultry meat and skin mixture onto said conveyor, a lower heated platen fixedly mounted on said frame, an upper heated platen slidably mounted on said guide posts, said conveyor being movable between said heated platens, driving means connected to said upper heated platen, said driving means being responsive to an applied force to move said upper platen from a spaced position to a position in mating engagement with said lower platen while said conveyor is maintained therebetween, said platens when mating engagement having a shape to define a cavity of predetermined size therebetween, said cavity being adapted to receive the predetermined quantity of comminuted poultry meat and skin mixture therein such that when the heated platens are moved into mating engagement the heat and pressure applied to the mixture is sufficient to uniformly distribute the mixture throughout the cavity and to coagulate a portion of the protein to form the artificial poultry skin, and means for controlling the time said upper platen is in mating engagement with said lower platen and being effective to have said driving means return said upper platen to the spaced position.

11. The apparatus according to claim 10 wherein said upper platen is provided with a plurality of cavities having the desired size of the artificial poultry skin to be fabricated.

12. The apparatus according to claim 10 wherein said upper platen comprises a die member connected to said driving means and a floatable bushing plate connected to said die member, said cavaties being defined by the openings in said bushing plate between said die member and said fixedly mounted platen when said platens are in mating engagement.

References Cited

UNITED STATES PATENTS

| | | | |
|---|---|---|---|
| 3,012,601 | 12/1961 | Lee | 100—93 P |
| 3,285,162 | 11/1966 | Schneider | 100—51 |
| 3,467,109 | 9/1969 | Block | 131—140 C |

ROBERT W. JENKINS, Primary Examiner

U.S. Cl. X.R.

100—93 P